March 15, 1949. F. B. SELLERS 2,464,532
CATALYTIC SYNTHESIS OF HYDROCARBONS
Filed Sept. 10, 1948
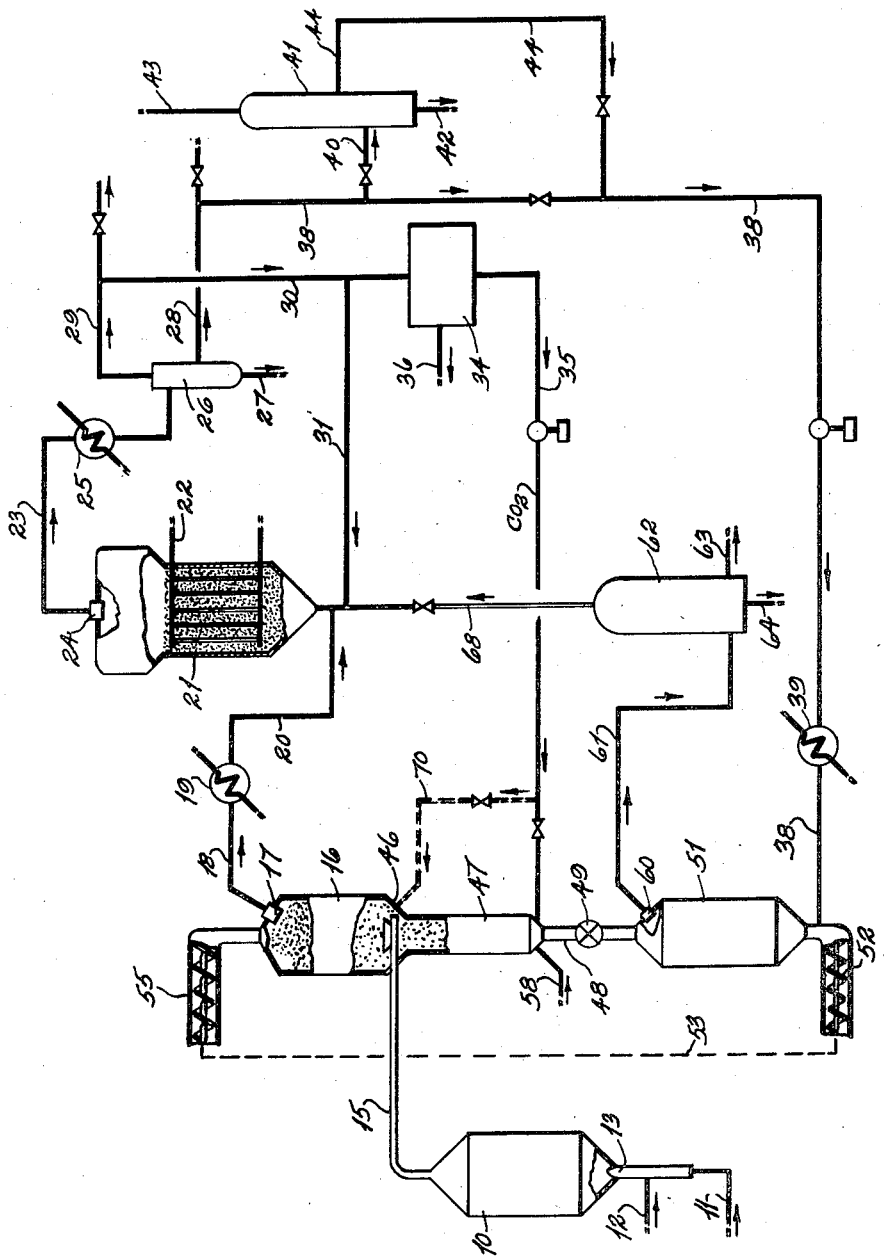
INVENTOR.
F. BURTON SELLERS
BY
ATTORNEYS Patented Mar. 15, 1949

2,464,532

UNITED STATES PATENT OFFICE 2,464,532

CATALYTIC SYNTHESIS OF HYDROCARBONS

Frederick Burton Sellers, New York, N. Y., assignor to Texaco Development Corporation, New York, N. Y., a corporation of Delaware Application September 10, 1948, Serial No. 48,740

10 Claims. (Cl. 260—449.6)

The present invention relates to the synthesis of hydrocarbons by the catalytic reduction of carbon oxide with hydrogen, and is more particularly concerned with effecting the conversion of the hydrocarbon product stream by the sensible heat of the high temperature synthesis gas delivered by the gas generator, and simultaneously supplementing the supply of synthesis gas available for catalytic conversion into desired hydrocarbons, oxygenated hydrocarbons and mixtures thereof.

The copending application of James H. Grahame, Serial No. 697,960, filed September 19, 1946, concerns utilizing the typically high temperature thermal energy of a synthesis gas generator effluent to thermally support desired conversion of hydrocarbon synthesis products, through the agency of a heat accumulating device comprising a solid thermophore which receives thermal energy directly from the high temperature synthesis gas and thereafter is brought into contact with the hydrocarbon at an elevated conversion temperature.

The term "solid thermophore" as used herein and in the aforesaid copending application means solid particle, heat-absorbing material, having the property of storing heat in a high temperature zone, and releasing said heat when transferred to a zone of lower temperature.

The present invention contemplates not only supporting the thermal requirements of the hydrocarbon conversion step but of concurrently effecting removal of carbon deposits laid down during the conversion or cracking step in such a way as to supplement, in substantial degree, the make of synthesis gas without increase in the pure oxygen requirement.

In accordance with the present invention, the synthesis gas generator is operated at typically high temperature of from 1800–3000° F. to convert a carbonaceous material, in the presence of free oxygen, preferably of high purity, into a synthesis gas comprising essentially hydrogen and carbon monoxide suitable for direct catalytic conversion into desired hydrocarbon fractions. The carbonaceous material may comprise a gaseous hydrocarbon such as methane or a liquid hydrocarbon fraction as kerosene, gas, oil, etc. A solid material such as coal, coke or the like, is equally suitable. In general, the lower hydrogen content of liquid and solid carbonaceous materials, does not necessarily mean that the resulting synthesis gas will be lower in hydrogen, since substantial quantities of water vapor may be included in the feed due to the fact that the heat of reaction of these materials is much greater than that of methane.

The effluent synthesis gas, at a temperature between 1800 and 3000° F., is passed in contact with a solid thermophore in a heating zone, which is thereby heated and thereafter continuously circulated to a hydrocarbon conversion zone and cyclically returned into contact with the hot effluent synthesis gas in the heating zone. In the hydrocarbon conversion zone, a hydrocarbon fraction contacts the thermophore at conversion temperature and is cracked, or otherwise transformed into desired products, simultaneously laying down on the thermophore a carbonaceous deposit.

An important feature of the present invention involves removal of this carbonaceous deposit in such a manner as to supplement the synthesis gas with substantial additional quantities of hydrogen and carbon monoxide. To this end, the thermophore is raised in the heating zone to a temperature materially above the hydrocarbon conversion range and, after withdrawal from contact with the hot effluent gas stream, the carbon-coated particles are subjected to contact with an oxidizing gas of the class consisting of water vapor and carbon dioxide. At temperatures above the hydrocarbon conversion range, as, for example, above 1200° F. and within the maximum upper limit of temperature to which the thermophore may be raised by the high temperature generator effluent, namely about, 2000–3000° F., the water vapor and/or carbon dioxide decomposes and removes the carbonaceous surface deposits with substantially quantitative formation of synthesis gas constituents.

Advantageously, passage of the oxidizing gases is effected along a path of increasing temperature, for example countercurrently, such that supplemental production of hydrogen and/or carbon monoxide is maximized by progressive heating and final release of the reaction products at maximum temperature.

Thereafter, the solid thermophore, at a temperature in the hydrocarbon conversion range, is employed in the hydrocarbon conversion zone to effect conversion of additional hydrocarbons, accumulating a deposit of carbonaceous material and being subsequently recycled to the heating zone as above.

The thermophore may be simply an inert refractory solid material, or may comprise a typical catalyst for the selected conversion reaction. For instance, it may comprise a conventional isomerization catalyst where a motor gasoline fraction is under treatment.

The invention particularly contemplates use of a hydrocarbon conversion catalyst, particularly one having isomerization, dehydrogenation or cracking characteristics, such that the product gases are highly unsaturated and branched. Selected hydrocarbon fractions from the synthesis reactor may be advantageously subjected to contact with said catalyst in the conversion zone, gaseous products of such conversion being recycled to the synthesis reactor resulting in an improved, overall yield and quality of synthetic hydrocarbons. The liquid products from the foregoing conversion step are of superior quality to the feed stock.

Such treatment is of particular benefit in respect to the oxygenated hydrocarbon fractions which more or less inevitably accompany the hydrocarbon synthesis product and are thus dehydrated and ultimately realized as desired hydrocarbons.

The increase in the production of synthesis gas moreover means additional production of desired hydrocarbon products without additional consumption of high purity, free oxygen, the preparation of which necessarily accounts for a substantial portion of the operating cost.

In order to describe the invention more specifically, reference is had to the attached drawing.

Therein the reference numeral 10 indicates more or less symbolically a synthesis gas generator, supplied with oxygen and methane from any convenient source not shown through respective inlet pipes 11 and 12. The respective feed streams may be preheated by any suitable means, not shown, including indirect exchange with a portion of the high temperature product gas, which will be hereinafter described.

Preheating may be carried into the range of above 500° F., typically 900° F. At the generator 10, the streams meet, at mixing nozzle 13 in the approximate molar ratio of about 2 parts methane to about one part oxygen, and react at a temperature above 1800° F., preferably above 2100° F. and usually around 2400 to 2600° F.

It is to be understood that the invention is not limited to the specific type of generator shown, but broadly contemplates any alternative type supplying a typical synthesis gas at an elevated temperature, for example, above 1200–1500° F., preferably about 2000–2400° F.

The high temperature product synthesis gas comprising $H_2$ and CO preferably in about a 2:1 molar ratio, passes through pipe 15 to a thermophore heating chamber 16, through which the catalyst or solid thermophore is continuously circulated.

Prior to introduction into chamber 16, the synthesis gas may be somewhat cooled by passage through a waste heat boiler or feed preheater, if the available thermal energy therein exceeds the thermal requirements of carbon removal and hydrocarbon conversion, or if the temperatures are otherwise excessive as regards the catalyst or solid thermophore employed.

The gases at a temperature of about 1200–2400° F., pass upwardly through the solid particle refractory thermophore in the chamber 16 and are withdrawn through refractory filter 17 and pipe 18 to exchanger 19, where they are adjusted to a temperature of 350–700° F. suitable for hydrocarbon synthesis and passed through pipe 20 to the lower or inlet portion of a synthesis reactor 21.

The synthesis reactor 21, indicated only symbolically, preferably embodies a chamber containing a mass of fluidized hydrocarbon synthesis catalyst with a suitable heat exchanger 22 disposed therein to maintain any predetermined, substantially uniform operating temperature, usually in the range of about 550–700° F. in the case of iron type synthesis catalysts. The reactant gases pass upwardly through the fluid phase of catalyst, separate from the upper surface thereof, flow into outlet pipe 23 through filter 24 or any other suitable separating means and thereafter are cooled in condenser 25 and subjected to physical separation in separator 26 into a water layer, a liquid hydrocarbon layer and a normally gaseous residue. The water layer is withdrawn as at 27, the normally liquid hydrocarbons as at 28 and the normally gaseous residue overhead as at 29.

A portion of the normally gaseous stream may be continuously recycled to the inlet of the synthesis reactor through branch pipes 30 and 31. Advantageously, a remaining portion of this stream is continuously treated to separate contained carbon dioxide for use in regenerating the thermophore and supplementing production of synthesis gas. The gas plant 34 is best exemplified by a Girbitol system wherein monoethanolamine selectively absorbs $CO_2$ from the gas, and is subsequently continuously steam stripped to yield a stream of relatively pure $CO_2$. The pure stream of carbon dioxide is discharged into pipe 35. The gases from which the $CO_2$ has been separated are withdrawn through pipe 36. The stream in pipe 36 together with any gas vented from pipe 29 may be used as fuel or otherwise.

The normally liquid hydrocarbon fraction in pipe 28, including a small amount of oxygenated hydrocarbons normally present, passes through branch pipe 38 to the conversion or cracking zone to be hereinafter described in greater detail. Preheating exchanger 39 may be provided when desired.

Advantageously, however, the hydrocarbon conversion step is restricted to selected product fractions particularly amenable to the desired improvement. To this end, valved branch pipe 40 leads from aforementioned pipe 38 to a fractionation system 41, from which heavy residual fractions are discharged through outlet 42 while the selected fraction is removed as a sidestream through pipe 44. The lighter fractions pass overhead through pipe 43 for any desired further use or treatment. For example, pipe 44 may deliver motor gasoline fractions suitable for reforming or isomerization, or gas oil fractions for cracking or dehydrogenation. Also, although not shown in the drawing, the heavy residual fractions in pipe 42 may be directed into pipe 38 for thermal or catalytic cracking. Obviously, then, any fraction can be thus separated depending on the product desired.

Reverting now to the heat accumulating chamber 16, solid particle thermophore at a temperature of about 1200–2000° F., for example, continuously gravitates through lower conical section 46 into a lower cylindrical regeneration chamber 47 which in turn communicates at the bottom with a standpipe 48 controlled by a feeder 49. Under the influence of the feeder 49, the standpipe 48 continuously delivers hot thermophore or catalyst to the conversion or cracking chamber 51. In turn, the cracking chamber 51 discharges solids through the lower portion through conveyor 52 which delivers catalyst into an elevator designated by a dotted line 53 from which the solid particles are returned by conveyor 55 into the upper portion of the chamber 16. Accordingly, the catalyst is continuously circulated in the closed cyclic path indicated and by appropriate regulation of the several feeding and conveying means, the thermophore establishes predetermined levels in the respective chambers.

As above indicated, the solid particles are delivered to the reaction chamber 47 at an elevated temperature which may approach that of the hot, incoming synthesis gas. The stream of carbon dioxide in pipe 35 passes upwardly, thru this chamber, endothermically consuming carbon from the surface of the solid particles and delivering carbon monoxide at the top of the chamber 47 in accordance with the reaction:

$$C + CO_2 = 2CO$$

Simultaneously, or alternatively, water vapor may be introduced from any suitable source not shown, through pipe 58 to react with the deposited carbon and liberate additional quantities of hydrogen in accordance with the reaction:

$$C + H_2O = H_2 + CO$$

It should be noted that the oxidizing gases pass upwardly through chamber 47 with a progressive increase in temperature, and are discharged at the maximum temperature level of regeneration as a result of which the effluent products achieve maximum conversion to hydrogen and carbon monoxide before entering chamber 16. This, in addition, largely obviates the necessity of extensively preheating the oxidizing gases and lowers thermophore temperature to the conversion range. The hydrogen and carbon monoxide thus formed mix with and supplement the synthesis gas delivered through pipe 15 and ultimately go to the reactor 21.

The thermophore passes from the chamber 47, relatively free from carbonaceous deposits, at a temperature in the hydrocarbon cracking or conversion range, as for example, 800–1500° F.

In the conversion zone, the hydrocarbon stream from pipe 38 passes upwardly preferably countercurrently, and is selectively cracked or otherwise converted, to desired gasiform conversion products which pass out through filter 60 and pipe 61 into a separation system represented symbolically as at 62. The separation system, for example, embodies a fractionator which discharges a primary product of motor gasoline through outlet pipe 63. Heavier fractions may be removed through lower pipe 64 and the normally gaseous residue passes overhead through pipe 68 into the hydrocarbon synthesis reactor 21 where it is largely consumed in the hydrocarbon synthesis reaction to form additional hydrocarbons boiling in the liquid hydrocarbon range.

The invention admits of further modifications. For example, the light gaseous hydrocarbon fraction discharged from gas plant 34 by pipe 36 may be recycled to the synthesis reaction zone for purposes substantially the same as those indicated immediately above.

The hydrocarbon synthesis catalyst may comprise a typical iron containing catalyst, in which case the product gases will be largely olefinic.

Referring by way of example to one specific method of operation, a synthesis gas generator is supplied with a stream of substantially pure methane and a stream of oxygen of about 90 per cent purity, in relative molar proportion of about 2:1, at temperatures of 1200° F. and 600° F. respectively, and a pressure of about 275 p. s. i. g. The synthesis gas product comprising essentially hydrogen and carbon monoxide leaves the generator at a temperature of about 2400° F. and is passed in countercurrent heat exchange relation with a solid particle thermophore having catalytic cracking properties as, for example, a cracking catalyst comprising about 12 parts of silica and 88 parts of alumina.

The synthesis gas leaves the thermophore at a temperature of about 1500° F. and the hot solid particles gravitate into a regeneration zone at a temperature of about 2400° F., where they are countercurrently contacted by an upflowing stream of carbon dioxide and water vapor. The gaseous stream reaching the top portion of the reaction chamber comprises essentially hydrogen and carbon monoxide, at a temperature above 2000° F. which mixes with the synthesis gas entering the heating chamber and supplements the synthesis gas make to the extent of about 25 per cent.

The solid particles from the decarbonization or regeneration chamber are continuously fed into a catalytic cracking zone at a temperature of about 1050° F. and contacted with a gas oil stream of about 30° API gravity produced in the synthesis reaction, yielding a motor gasoline fraction of about 80 octane by the C. F. R. motor method, a relatively smaller fraction of higher boiling components and a normally gaseous fraction which is returned to the inlet of the synthesis reactor.

Catalyst is continuously withdrawn from the cracking chamber at a temperature of about 950° F. and returned to the preheating chamber.

The total synthesis gas leaving the thermophore at a temperature of about 1500° F. is cooled to about 600° F., producing about 158,000 pounds per hour of steam thereby, and then is continuously passed through a fluidized mass of solid particle iron catalyst of about 200 mesh and finer at a temperature of about 650° F. and a pressure of about 250 p. s. i. under conditions such that the catalyst is in a uniform state of dense phase fluidization. The normally liquid hydrocarbon products withdrawn from the upper surface of the catalyst yield about 70 per cent motor gasoline fractions, on the basis of the total hydrogen and carbon monoxide supplied to the synthesis zone.

It must be particularly emphasized that stripping of the carbonaceous deposits with oxidizing gas must necessarily be effected in a zone separate from that occupied by the main flow of synthesis gas, since the high concentration of hydrogen and carbon monoxide in the synthesis gas have the effect of inhibiting the reaction of carbon dioxide or water vapor with the carbonaceous deposits.

On the other hand, it has been discovered that where the synthesis gas comprises substantial proportions of carbon dioxide, for example, above five to above ten mol per cent, such as may be frequently met within the practical operation of many coal gasification processes, this objection may be substantially overcome. Under such conditions, the carbon dioxide stream in pipe 35 may be partly or entirely diverted through valved branch pipe 70 into the lower portion of the preheating chamber 16 to admit with the upflowing stream of hot synthesis gas from pipe 15.

A typical generator operating to produce a synthesis gas containing relatively high proportions of carbon dioxide may be exemplified by a coal gasification unit wherein a mass of fine particle, fluid phase coal at an elevated temperature is subjected to the continual upflow of controlled proportions of water vapor and relatively pure oxygen.

While the invention has been illustrated largely in connection with specific forms of hydrocarbon conversion, it is broadly adaptable generally to all types of hydrocarbon conversion involving endothermic reactions at temperatures above about 700° F.

Isomerization and dehydration may be carried out at the top range of from about 800–1100° F. and preferably 900–1050° F. Dehydration is important in converting the oxygenated compounds normally present in the synthesis product into hydrocarbon fractions.

Catalytic materials particularly useful for such operations are those including bauxite, kaolin and/or kieselguhr. In this case, optimum conversion temperatures are preferably in the range of 700–950° F., best about 800–900° F., depending in some measure on the nature of the fraction treated and the character of the desired product. Cracking temperatures vary from 850 to 1150° F.

On the other hand, the invention, as above stated, also contemplates use simply of a heat-absorptive thermophore of no particular inherent catalytic properties, such for example, as fire clay, magnesia, titania, thoria, Carborundum and the like, which at the elevated temperature involved is capable of effecting thermal decomposition of hydrocarbon fractions. As above indicated, any usual hydrocarbon synthesis catalyst, may occupy the synthesis zone, for example, iron, cobalt, nickel or ruthenium, of which iron and cobalt are preferred. It is understood, of course, that the synthesis catalyst may include any of the conventional promoters or activators such as alkali metal and oxides of the alkaline earth metals, thoria, titania, zirconia, etc., in the usual proportions.

Obviously, many modifications and variations of the invention as set forth may be made without departing from the spirit and scope thereof and therefore only such limitations should be imposed as are indicated in the appended claims.

I claim:

1. In the synthesis of hydrocarbons, oxygenated hydrocarbons and mixtures thereof, the steps which comprise generating a high temperature stream of synthesis gas comprising essentially hydrogen and carbon monoxide, continuously passing said gas in heat transfer relationship with a solid particle heat absorptive thermophore, having thereon solid carbonaceous deposits as a result of conversion of hydrocarbon fractions, thereby heating the thermophore to an elevated temperature level at which said carbonaceous material is reactive with an oxidizing gas of the class consisting of water vapor and carbon dioxide to form synthesis gas constituents, contacting said heated thermophore with said oxidizing gas in a regeneration zone, effecting reaction between said oxidizing gas and said carbonaceous deposit to an extent such that a substantial proportion, at least, of said carbonaceous deposit is removed from the surface of said thermophore, recovering substantial additional quantities of synthesis gas constituents formed in said regeneration zone, mixing said synthesis gas constituents with said first-named synthesis gas stream and effecting substantial catalytic conversion thereof into desired products of the class consisting of hydrocarbons, oxygenated hydrocarbons and mixtures thereof.

2. The method according to claim 1, wherein said oxidizing gas is subjected to contact with said solid carbonaceous material in a regeneration zone separate from said first-named synthesis gas stream.

3. The method according to claim 1, wherein said first-named synthesis gas stream and said oxidizing gases move countercurrently with respect to said solid particle, heat-absorptive thermophore.

4. In the synthesis of hydrocarbons, oxygenated hydrocarbons and mixtures thereof, the steps which comprise generating a high temperature stream of synthesis gas comprising essentially hydrogen and carbon monoxide, continuously passing said gas in heat transfer relationship with a solid particle, heat absorptive thermophore, having thereon solid carbonaceous deposits as a result of conversion of hydrocarbon fractions, thereby heating the thermophore to an elevated temperature level at which said carbonaceous material is reactive with an oxidizing gas of the class consisting of water vapor and carbon dioxide to form synthesis gas constituents, contacting said heated thermophore with said oxidizing gas in a regeneration zone, effecting reaction between said oxidizing gas and said carbonaceous deposit to an extent such that a substantial proportion, at least, of said carbonaceous deposit is removed from the surface of said thermophore, recovering the synthesis gas constituents formed in said regeneration zone, thereafter subjecting said thermophore at a temperature in hydrocarbon conversion range to contact with a hydrocarbon fraction, effecting substantial conversion of said hydrocarbon into desired product fractions such that carbonaceous deposits are formed thereon, and continuously recycling resulting thermophore into heat exchange relation with said first-named stream of synthesis gas.

5. The method according to claim 4, wherein said solid particle thermophore comprises a hydrocarbon conversion catalyst.

6. The method according to claim 4, wherein said thermophore comprises a hydrocarbon conversion catalyst effective for dehydrogenation and isomerization of liquid hydrocarbon fractions.

7. The method according to claim 4, wherein said solid particle thermophore comprises a refractory material of substantial catalytic inertness and wherein said conversion comprises thermal cracking.

8. In the synthesis of hydrocarbons, oxygenated hydrocarbons and mixtures thereof, the steps which comprise continuously circulating a mass of solid particle, heat absorptive thermophore in a closed cyclic path comprising successively a heat absorption zone, a decarbonization zone and a hydrocarbon conversion zone where carbonaceous deposits are laid down thereon, subjecting said thermophore in said heat transfer zone to contact with a flow of high temperature synthesis gas comprising essentially hydrogen and carbon monoxide above about 2000° F., thereby cooling said stream of synthesis gas and raising the temperature of the thermophore to a level effective for the endothermic interaction of carbonaceous deposits with an oxidizing gas of the class consisting of water vapor and carbon dioxide, continuously subjecting said heated thermophore in the decarbonization zone to contact with said oxidizing gas, effecting thereby a substantial removal of carbonaceous deposits from the said thermophore particles and simultaneous formation of substantial proportions of additional synthesis gas constituents, subjecting said thermophore in said hydrocarbon conversion zone at an elevated temperature to contact with a hydrocarbon fraction, and catalytically converting said synthesis gas constituents into substantial quantities of desired liquid hydrocarbons.

9. In the synthesis of hydrocarbons, oxygenated hydrocarbons and mixtures thereof, the steps which comprise continuously circulating a mass of solid particle, heat absorptive thermophore in a closed cyclic path comprising successively a heat absorption zone, a decarbonization zone and a hydrocarbon conversion zone, where carbonaceous deposits are laid down thereon, subjecting said thermophore in said heat absorption zone to contact with a flow of high temperature synthesis gas comprising essentially hydrogen and carbon monoxide above about 2000° F., thereby cooling said stream of synthesis gas and raising the temperature of the thermophore to a level effective for the endothermic interaction of carbonaceous deposits with an oxidizing gas of the class consisting of water vapor and carbon dioxide, continuously subjecting said heated thermophore in the decarbonization zone to contact with said oxidizing gas, effecting thereby a substantial removal of carbonaceous deposits from the said thermophore particles and simultaneous formation of substantial proportions of additional synthesis gas constituents, subjecting said thermophore in said hydrocarbon conversion zone at an elevated temperature in the hydrocarbon conversion range to contact with a hydrocarbon fraction, catalytically converting said synthesis gas constituents into substantial quantities of desired liquid hydrocarbons, and continuously supplying a hydrocarbon fraction from said synthesis as a feed stock to said hydrocarbon conversion zone.

10. The method according to claim 9, wherein the hydrocarbon fraction fed to the hydrocarbon conversion zone is a gasoline fraction, and the solid particle thermophore comprises a catalyst effective for the isomerization of said hydrocarbon fraction.

F. BURTON SELLERS.

REFERENCES CITED

The following references are of record in the file of this patent:

UNITED STATES PATENTS

| Number | Name | Date |
| --- | --- | --- |
| 1,977,684 | Lucke | Oct. 23, 1934 |
| 2,248,196 | Plummer | July 8, 1941 |
| 2,284,603 | Belchetz et al. | May 26, 1942 |
| 2,347,682 | Gunness | May 2, 1944 |
| 2,400,075 | Claussen | May 14, 1946 |
| 2,405,395 | Bahlke et al. | Aug. 6, 1946 |